No. 729,083. PATENTED MAY 26, 1903.
R. A. MOORE, Jr.
HINGE JOINT.
APPLICATION FILED FEB. 19, 1903.
NO MODEL.

Witnesses.
S. H. Clarke
P. J. Egan

Inventor.
Roswell A. Moore Jr.
By James Shepard.
Atty.

No. 729,083. Patented May 26, 1903.

UNITED STATES PATENT OFFICE.

ROSWELL A. MOORE, JR., OF KENSINGTON, CONNECTICUT.

HINGE-JOINT.

SPECIFICATION forming part of Letters Patent No. 729,083, dated May 26, 1903.

Application filed February 19, 1903. Serial No. 144,062. (No model.)

*To all whom it may concern:*

Be it known that I, ROSWELL A. MOORE, Jr., a citizen of the United States, residing at Kensington, in the county of Hartford and State of Connecticut, have invented certain new and useful Improvements in Hinge-Joints, of which the following is a specification.

My invention relates to improvements in hinge-joints; and the object of my improvement is simplicity in construction and efficiency in operation.

Figure 1:
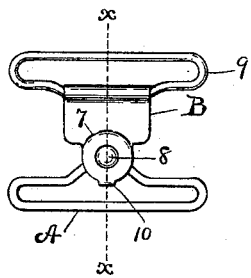
Figure 2:
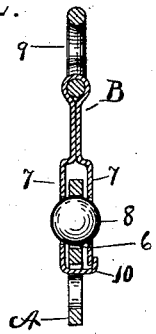
Figure 3:
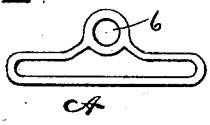
Figure 4:
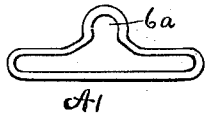
Figure 5:
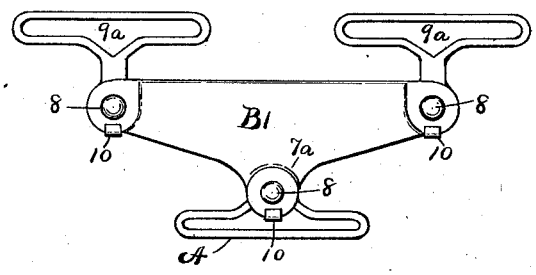

Figure 1 is a front elevation of my hinge-joint. Fig. 2 is an enlarged sectional view of the same on the line $x\ x$ of Fig. 1, the central member or axle of the joint being in side elevation. Fig. 3 is a front view of the lower member of my hinge-joint on the same scale as Fig. 1. Fig. 4 is a like view showing a modified form of the same. Fig. 5 is a rear elevation of a jointed connection having three hinge-joints instead of only one.

I have shown my hinge-joint in a form especially adapted for suspenders; but any straps or cords other than suspenders may be attached to my hinge member, if desired.

The novelty of the device resides in so much of the members as form the hinge-joint, and this joint may be applied to connections or members of varying form for use in connection with any article where a joint is desired for suspensory or pulling devices, as in harnesses, ship-rigging, and analogous arts in which the swinging movement is confined substantially to one plane instead of swinging in different planes like an ordinary ball-and-socket or universal joint.

A designates the lower member of my hinge-joint and consists, essentially, of a loop for a strap and a pivotal or suspensory eye 6. The upper member B has a body consisting, essentially, of a pair of plates 7 7, having ball-receiving pockets arranged opposite each other, the ball 8 axially confined within the pockets of the said plate members, and the loop 9 for a strap. The ball is a short axle or spherical pivot, and the pivotal eye 6, between the plates 7 7, swings in one single plane on the middle portion of the short axle formed by the said ball. The pair of plates are preferably formed in one piece of metal doubled upon itself at the upper edge, where it receives the loop 9 and is provided with the fastening device 10 at the unbent edges to hold the plates together. The metal in the bend at the doubled part of these plates and the said device 10 taken together constitute means for holding the said plates together to confine the axle or ball therein. I prefer to employ a ball of hardened steel. The said ball has a diameter in excess of the thickness of the metal at the eye 6, so that opposite sides of the ball may project beyond the eye and form spherical pivots that are received and held in the pockets of the plates. The ball-pockets in the plates 7 7 are those portions of the said plates which immediately surround the laterally-projecting sides of the ball for confining the ball axially within the said plates. These pockets being filled by the ball 8 are clearly indicated by the reference-numeral 8, that indicates the ball.

In Fig. 4 the loop A' is essentially the same as the loop A, and the eye $6^a$ differs from the eye 6 only by the omission of the separating-bar of metal between the eye and loop.

The parts are assembled by placing the ball in the ball-pocket of one of the plates on the inner side, then placing the pivotal eye 6 of the member A over the said plate with the ball in the said eye, then bringing the other plate into its proper position to have the ball project a little into the ball-pocket therein, and then fasten the two plates so that they cannot spread apart and let the ball escape. As shown, they are fastened by clenching the end of the fastening device over the outer side of the plate opposite the one on which said device is formed.

In Fig. 5 I have shown the same construction of hinge-joint, only there are three joints instead of one. The lower member or loop A is the same as in Figs. 1, 2, and 3, and the upper member B' consists of a pair of plates $7^a$, having opposite ball-pockets, three balls 8, and two loops $9^a$, each loop having an eye that is pivoted on the said ball the same as in the loop A. The pair of plates are also secured together by the bend at their upper edges and by the lugs or fastening devices 10 at their unbent edges.

By my improvement a smooth and easy working hinge-joint is produced in which the ball changes its position in its bearing, so that the wear on the ball is even. The single ball is confined on spherical pivots and constitutes the axle of the joint.

I claim as my invention—

1. In a hinge-joint, a member comprising a single ball that serves as an axle, the diametrical opposite sides of which ball form spherical pivots for the said axle, and a pair of plates having opposite ball-pockets of a shape and size to confine axially the said axle by engaging the said spherical pivots, and a second member having a pivotal eye between the said plates and swinging in one single plane on the middle portion of the short axle formed by the said ball.

2. In a hinge-joint, a spherical pivot, a pair of plates having circular pockets for axially confining the said spherical pivot in the said plates by engaging opposite sides thereof, means for confining the said plates in position to hold the said spherical pivot in place, and a pivotal eye between the said plates mounted on the middle portion of the said pivot for swinging in a single plane.

3. A hinge-joint, consisting of the loop 9, a pair of plates connected with the said loop and having oppositely-arranged ball-pockets, a single ball with its opposite pivot-like sides projecting into and confined axially by the said pockets, and a loop A having an eye arranged between the said pair of plates and pivoted by the said eye to the middle portion of the said ball for swinging in a single plane.

ROSWELL A. MOORE, JR.

Witnesses:
JAMES SHEPARD,
SHEFFIELD H. CLARKE.